United States Patent Office 3,232,028
Patented Feb. 1, 1966

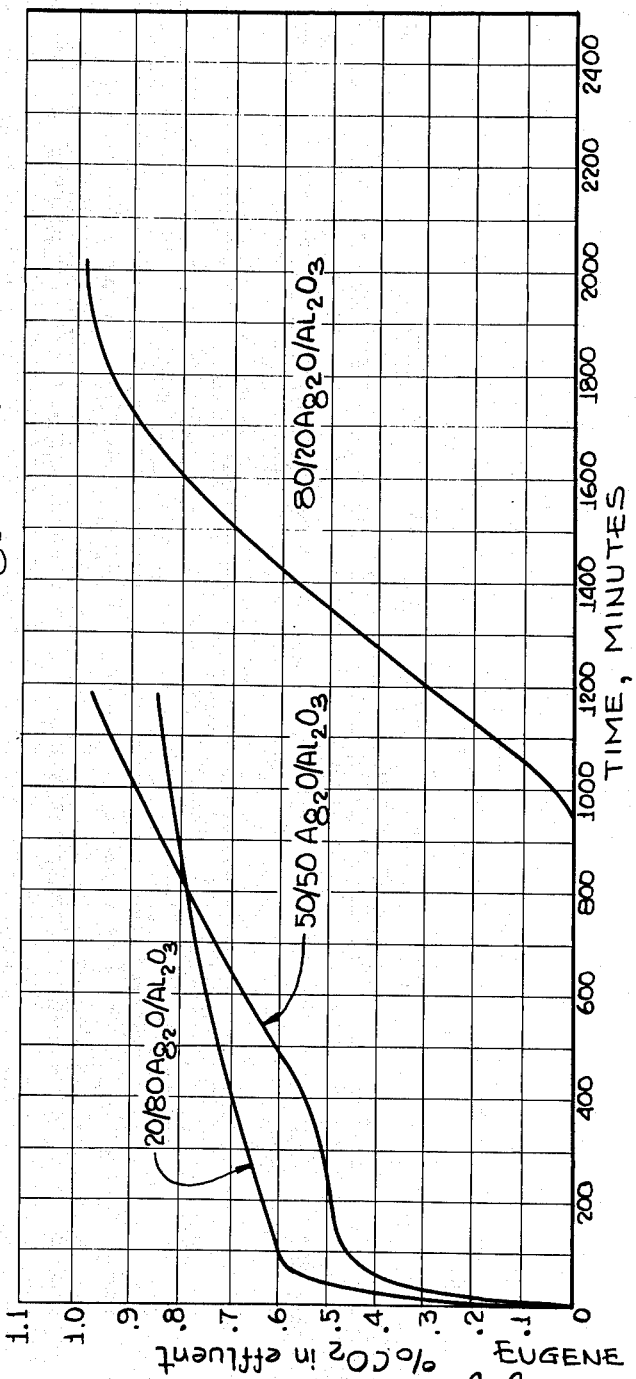

3,232,028
COMPOSITION AND METHOD FOR ABSORPTION AND REGENERATION OF CARBON DIOXIDE
Eugene J. McDonald, South Floral Park, N.Y., and George H. Walden, Leonia, N.J., assignors to Isomet Corporation, Palisades Park, N.J., a corporation of New Jersey
Filed July 2, 1962, Ser. No. 206,727
10 Claims. (Cl. 55—68)

This invention relates to a novel composition and method for the absorption of carbon dioxide from gas streams. More particularly, the invention concerns an absorbent for gaseous carbon dioxide comprising silver oxide coprecipitated with a gelatinous metal hydroxide and dried to a highly porous mass.

Numerous methods have been proposed for the removal and recovery of carbon dioxide from industrial waste and mine gases, from the air, and from gases produced by animal metabolism, such as human respiration. The latter problem has become of increased importance from the point of view of manned space flight, for it is imperative in the design of closed ecological systems such as are proposed for use in manned space flight vehicles that the carbon dioxide exhaled by the occupants of the vehicle be removed from the remainder of the air and concentrated so that it may be either disposed of or further processed to convert it to oxygen. In industry, carbon dioxide is produced in large amounts by fermentation of carbohydrate materials and sugars, in the manufacture of lime and cement, and in the combustion of coal, coke and natural gas. It is recovered by absorption by solutions of sodium carbonate or of ethanolamines. Much carbon dioxide is used commercially for refrigeration in the form of solid carbon dioxide, or Dry Ice.

In addition to the liquid absorbents mentioned, efforts have long been made in the prior art to develop solid absorbents capable of removing carbon dioxide from gas streams, but the absorbents thus far available have possessed certain disadvantages, and their efficiency has not been adequate.

Among the most satisfactory solids thus far available for removing carbon dioxide from gas streams are the so-called molecular sieves. These are microporous zeolites or similar synthetic silicates the atoms of which are arranged in such a way that there are a large number of small cavities interconnected by smaller openings of precisely uniform size. Normally these cavities contain water molecules, but upon heating, this water is driven off without any change in the remaining crystal lattice. The network of cavities and pores may occupy 50% of the total volume of the crystals. In the absence of water molecular sieves will adsorb other molecules that are small enough to pass through the pores. These small molecules may thus be separated from a mixture with larger molecules. Based on this size difference, some molecular sieves are capable, under certain conditions, of removing carbon dioxide from gases. The carbon dioxide can, by further processing of the molecular sieves, be removed and concentrated.

There are associated with the use of molecular sieves for carbon dioxide removal and recovery, certain disadvantages which have necessitated the development of more suitable absorbents. Among these are the low capacity of the molecular sieves for carbon dioxide and the coadsorption of small amounts of other gases which act to contaminate the carbon dioxide upon its removal from the molecular sieve and subsequent concentration. Another disadvantage is that molecular sieves have a strong tendency to readsorb water, thus making it necessary to predry the gas stream prior to removal of carbon dioxide. The molecular sieves are commercially available in two sizes, having pore openings 4 and 5 angstrom units in diameter.

The unusual conditions existing in manned space vehicles, such as the absence of a gravitational field and restrictions as to weight and volume, make the use of systems employing liquid as absorbents, or the operation of large, high pressure compressors to condense out the carbon dioxide impractical. In general, in this situation, one is restricted to the use of solid absorbing materials since these offer no problems with respect to separation of carbon dioxide from the absorbent in a non-gravitational field.

The use of silver oxide as a chemical absorbent for carbon dioxide has been proposed in the prior art, but experience has indicated that silver oxide absorbs carbon dioxide very slowly. Attempts to improve the rate of absorption have been made by depositing the silver oxide on porous substrates, such as pumice, activated bauxite, or activated alumina. These efforts to improve the rate of carbon dioxide absorption met with some success, but the amounts of silver oxide that could be deposited on the solid substrate were so small that the capacity of the resulting absorbent for carbon dioxide removal was very limited. The use of such solid absorbents for the purpose contemplated by the present invention was therefore impractical.

It is accordingly an object of the present invention to provide a material capable of absorbing carbon dioxide from a gas stream which has a high capacity for carbon dioxide, which is unaffected by the presence of moisture in the gas stream, which will operate at ordinary temperature, and which will readily release the carbon dioxide in substantially pure form.

It is a further object of the invention to provide a novel method for the preparation of the carbon dioxide absorbent.

Still another object is the provision of a method for the treatment of a gas stream containing carbon dioxide with the novel absorbent to effect removal and recovery of the carbon dioxide.

Further objects will become apparent from a consideration of the appended disclosure and claims.

In accordance with the present invention, there is provided for the first time, a practical and efficient method of preparing a silver oxide absorbent in which the silver oxide is present in a very finely divided and microporous form possessing both a high capacity and a high rate of carbon dioxide absorption, and in which the presence of water in the gas stream being treated exerts a favorable, and not a detrimental effect.

The silver oxide is brought into the desired finely divided microporous form by coprecipitation of a silver salt with a salt of a metal capable of forming an oxide having a highly gelatinous structure in its hydrated or hydrous form, and which becomes highly porous upon drying.

In the preferred practice of the invention, the silver is precipitated in the form of silver carbonate, which decomposes to silver oxide when the preparation is dried. The other oxide serves to disperse the silver oxide in a very finely divided form in admixture therewith and to maintain the absorbent in a porous condition so that the gas being treated may freely penetrate all portions of the absorbent. The precipitation of the silver as a carbonate followed by its decomposition to silver oxide produces markedly better results than when the silver is precipitated directly as the oxide. This is probably because the silver oxide has been preconditioned by being originally in the form of a carbonate and the structure of the resulting silver oxide is better adapted to absorb carbon dioxide.

Silver salts which may be employed in accordance with the invention are preferably those soluble in water, and which are reasonably stable toward exposure to light. Suitable silver salts include salts of both inorganic and organic acids, such as, for example, the nitrate, acetate, benzoate, fluoride, and the like, but silver nitrate is preferred owing to its solubility and availability.

The other metal oxides are those which form gelatinous or hydrous oxides upon precipitation, such as the oxides of aluminum, chromium, iron or zirconium, or silica.

The proportions of the silver oxide and the other oxide are not critical and may be varied in accordance with the desired character of the absorbent preparation. Thus, by varying the ratio of the oxides the mechanical strength of the absorbent can be changed from a rather friable, easily powdered material to a hard, strong body having any desired shape. The ratio of silver oxide to other metal oxide may range, for example, from about 80:20 to about 20:80, but preferably the silver oxide will predominate. A preferred ratio of silver oxide to other metal oxide is 80:20.

The sources of the other metal oxides are water soluble salts of aluminum, iron, chromium or zirconium, such as the nitrates of these metals, or solutions of silicic acid salts, such as sodium silicate. There should not be used salts of which the anions will precipitate the silver, such as halides. The aqueous solutions of these metal salts will, upon treatment with a soluble carbonate, or with a dilute alkali, precipitate a metal carbonate or a gelatinous metal hydroxide, such as aluminum hydroxide, ferric hydroxide, chromium hydroxide, or zirconium hydroxide, or ferric carbonate, or chromium carbonate. Upon drying and/or heating these precipitates form a highly porous mass of the corresponding metal oxide. For coprecipitation of silver carbonate with silicic acid, suitable adjustment of pH may be necessary. The preferred salt for coprecipitation is an aluminum salt.

In accordance with the invention, coprecipitation of the silver carbonate and the carbonate or hydroxide of the other metal is carried out by adding to an aqueous solution in the desired ratio of the silver salt and the salt of the other metal, an aqueous solution of an alkali metal carbonate, such as sodium or potassium carbonate. Preferably the solution of the two metal salts is added as rapidly as possible without causing excessive frothing to the alkali metal carbonate solution. The silver precipitates as silver carbonate, and the metal as a carbonate or hydroxide. The reactions are illustrated by the following equations:

$$2Ag^+ + 2HCO_3^- \rightarrow Ag_2CO_3 + H_2O + CO_2$$
$$Al^{+++} + 3CO_3^= + 3H_2O \rightarrow Al(OH)_3 + 3HCO_3^-$$

The precipitate is filtered and suspended in water, and this step is repeated to the extent necessary to wash out excess alkali metal carbonate. The washed wet precipitate is dried at about 110° to 130° C. at atmospheric pressure for several hours. After drying, the silver carbonate and the carbonate of the other metal, if the metal used has been one which first forms a carbonate, are decomposed to silver oxide and metal hydroxide or oxide by heating their mixture to about 150° to 180° C. for up to 20 hours under high vacuum, followed by further heating at 180° to 220° C. for 6 to 9 hours under high vacuum. The vacuum may be, for example, 2 mm. Hg.

Where the solution of the silver salt and the other metal salt is precipitated with a dilute alkali, for example, a dilute solution of potassium hydroxide or of sodium hydroxide, the silver oxide and the hydroxide of the other metal are formed directly, and are washed and dried and subjected to further heating in substantially the same manner.

The cencentration of silver salt in the aqueous solution will depend upon the ratio of silver oxide to other metal oxide desired in the final absorbent preparation, but will generally range from about 1% to about 15% by weight. The concentration of the salt of the other metal will also depend upon the desired ratio to silver oxide, but will range from about 2% to about 15% by weight. The concentration of alkali metal carbonate employed for precipitation will be in the range of 5% to about 30% by weight.

The invention will be illustrated with respect to the preferred embodiment which is an absorbent comprising a mixture of silver oxide and aluminum oxide. The latter may exist in partially hydrated form in said mixture under the conditions of preparation.

The following table indicates the amounts of silver nitrate, aluminum nitrate nonahydrate and sodium carbonate required to prepare approximately 100 grams of final dry mixture containing three different ratios of silver oxide to aluminum oxide:

TABLE 1

| $Ag_2O/Al_2O_3$ | $Na_2CO_3$, gms. | $Al(NO_3)_3 \cdot 9H_2O$, gms. | $AgNO_3$, gms. |
| --- | --- | --- | --- |
| 80/20 | 125 | 147 | 117.5 |
| 50/50 | 312 | 367 | 73.2 |
| 20/80 | 513 | 595 | 29.3 |

The following examples serve to illustrate the method of preparation of the carbon dioxide absorbent of the invention, but are not to be regarded as limiting:

*Example 1*

117.5 grams of silver nitrate and 147 grams of aluminum nitrite nonahydrate were dissolved in 1500 cc. of of water. A solution of 125 grams of sodium carbonate in 1500 cc. of water was prepared, and the solution of silver and aluminum salts was added to the sodium carbonate solution as rapidly as possible without causing excessive frothing. The precipitate formed was filtered on a Buchner funnel and then suspended in water and stirred and filtered. The precipitated mixture was washed twice more to remove sodium carbonate. The wet washed precipitate was then extruded through a 10-mesh nickel screen and dried at 120° C. at atmospheric pressure for 16 hours. Following this drying, the mixture was heated to 170°–175° C. at 2 mm. Hg pressure for 16 hours, and then further heated at 200° C. at 2 mm. Hg pressure for 9 hours. The final product contained silver oxide and aluminum oxide in a ratio of 80:20.

*Example 2*

73.2 grams of silver nitrate and 367 grams of aluminum nonahydrate were dissolved in 1500 cc. of water. A solution of 312 grams of sodium carbonate in 1500 cc. of water was prepared, and the solution of the silver and aluminum was added to the sodium carbonate solution as rapidly as possible without causing excessive frothing. The precipitate formed was filtered on a Buchner funnel and then suspended in water, stirred and filtered. The precipitated mixture was washed twice more to remove sodium carbonate. The wet, washed precipitate was then extruded through a 10 mesh nickel screen and dried at 120° C. at atmospheric pressure for 16 hours, and then further heated at 205° C. at 2 mm. Hg pressure for 8 hours. The final product contained silver oxide and aluminum oxide in a ratio of 50:50.

*Example 3*

29.3 grams of silver nitrate and 595 grams of aluminum nitrate nonahydrate were dissolved in 1500 cc. of water. A solution of 513 grams of sodium carbonate in 1500 cc.

of water was prepared, and the solution of the silver and aluminum salts was added to the sodium carbonate solution as rapidly as possible without causing excessive frothing. The precipitate formed was filtered on a Buchner funnel and then suspended in water, stirred and filtered. The precipitated mixture was washed twice more to remove sodium carbonate. The wet, washed precipitate was then extruded through a 10 mesh nickel screen and dried at 120° C. at atmospheric pressure for 16 hours. Following this drying, the mixture was heated to 175° C. at 2 mm. Hg pressure for 16 hours, and then further heated at 205° C. at 2 mm. Hg pressure for 6 hours. The final product contained silver oxide and aluminum oxide in the ratio 20:80.

The silver oxide absorbent preparations of the invention are adapted for use in any suitable manner, including columns packed with absorbent, or absorption vessels containing the absorbent in the form of a fixed bed or a fluidized bed, or any other of the well known techniques for employing solid absorbents. The absorbent bed must be of sufficient size to return the carbon dioxide concentration to the desired value. In accordance with an advantageous mode of carrying out the invention, a column is packed with the silver oxide preparation and the gas containing the carbon dioxide is passed through the column and in contact with the solid absorbent. In its passage through the column, the carbon dioxide is removed from the gas, the concentration of carbon dioxide in the effluent gas stream depending upon the rate of passage of the incoming gas, the temperature, and the degree of saturation of the absorbing bed with carbon dioxide. It has been found that markedly superior results are obtained if the gas being treated contains water vapor. This would be true of respiratory exhalations in a space vehicle. This is in contrast to the detrimental effect of such water vapor where a molecular sieve is employed, and constitutes an important advantage of the present invention.

In general, the higher the ratio of silver oxide to aluminum oxide the more effective is the carbon dioxide removal and the longer the life of the absorbent. The drawing shows the results achieved in the absorption of carbon dioxide from air saturated with water and containing 1% $CO_2$ by volume, passed through a column at a rate of 500 cc. per minute, using preparations containing 20%, 50% and 80% silver oxide, respectively. The concentration of carbon dioxide in the effluent gas from the column is shown for the three preparations. The 80% $Ag_2O$ preparation was the most efficient, producing no $CO_2$ in the effluent gas for 800 minutes.

The silver oxide absorbents prepared in accordance with the invention by coprecipitation with another metal oxide are more efficient absorbers of carbon dioxide than other preparations known for this purpose, including pure silver oxide, silver oxide deposited upon a substrate such as pumice or bauxite, or a molecular sieve (type 5). The silver oxide absorbents of the invention are not affected adversely by moisture in the gas stream, they have higher total capacities for carbon dioxide than pure silver oxide or silver oxide deposited on a substrate, and a more rapid rate of absorption.

In addition, the preparations of the invention permit regeneration of the absorbent and liberation of the absorbed carbon dioxide at temperatures lower than those required for molecular sieves and other silver oxide catalysts. The regeneration temperature of the absorbents of the invention is in the range of about 150° C. to about 220° C. Regeneration is accomplished simply by heating the silver oxide preparation and applying a vacuum. This causes the silver carbonate to decompose, liberating the $CO_2$ and regenerating the silver oxide. The regeneration process is illustrated by the following example:

*Example 4*

The 80:20 silver oxide-aluminum oxide mixture was regenerated by heating to 170° C. for 16 hours at 2 mm. Hg and then at 200° C. and 2 mm. Hg for 5 hours. Gravimetric determination of the $CO_2$ evolved indicated that 89% of the $CO_2$ had been removed by the end of the heating cycle. The vacuum pump used had a free air capacity of 21 liters/min.

What is claimed is:

1. The method of preparing a solid absorbent for carbon dioxide having finely divided microporous silver oxide dispersed and in admixture with aluminum oxide, comprising the steps of co-precipitating a silver salt and an aluminum salt with alkali metal carbonate and heating the precipitate to form said oxides.

2. Method for the preparation of a solid absorbent for carbon dioxide which comprises the steps of reacting an aqueous solution of a silver salt and a salt of a metal capable of forming an oxide having a highly gelatinous structure in its hydrous form and which becomes highly porous upon drying, with an aqueous solution of an alkali metal carbonate to coprecipitate silver carbonate and a gelatinous compound of said metal, washing the resulting precipitate with water, drying, and heating the precipitate to form a mixture of finely divided silver oxide and metal oxide.

3. Method for the preparation of a solid absorbent for carbon dioxide which comprises the steps of reacting an aqueous solution of a silver salt and an aluminum salt with an aqueous solution of an alkali metal carbonate to coprecipitate silver carbonate and aluminum hydroxide, washing the resulting precipitate with water, drying, and heating the precipitate to form a mixture of finely divided silver oxide and aluminum oxide.

4. Method for the preparation of a solid absorbent for carbon dioxide which comprises the steps of reacting an aqueous solution of sodium carbonate to coprecipitate silver carbonate and aluminum hydroxide, washing the precipitate with water, drying, and heating the precipitate at about 150° to 180° C. under vacuum for several hours and further heating at about 180° to 220° C. under vacuum to form a mixture of finely divided silver oxide and aluminum oxide.

5. Method for the removal of carbon dioxide from a gas containing the same which comprises contacting the gas with a solid absorbent comprising finely divided microporous silver oxide dispersed and in admixture with aluminum oxide, said absorbent having been prepared by coprecipitation of a silver salt and an aluminum salt with alkali metal carbonate and heating the precipitate to form said oxides.

6. Method for the removal and recovery of carbon dioxide from a gas containing the same which comprises contacting the gas with a solid absorbent comprising finely divided microporous silver oxide dispersed and in admixture with aluminum oxide, said absorbent having been prepared by coprecipitation of a silver salt and an aluminum salt with alkali metal carbonate and heating the precipitate to form said oxides, until said absorbent has absorbed a substantial amount of carbon dioxide, and then heating the absorbent to regenerate same and to liberate the absorbed carbon dioxide.

7. A method for removing carbon dioxide from a gas containing same comprising absorbing the gas with a highly porous solid absorbent comprising finely divided microporous silver oxide, said silver oxide being in admixture with aluminum oxide, said absorbent having been prepared by co-precipitation of a silver salt and an aluminum salt with an alkali metal carbonate and heating the precipitate to form said oxides.

8. A process for the removal of carbon dioxide from a carbon dioxide-containing gas which comprises contacting the gas with a highly porous solid absorbent comprising a decomposed precipitate forming a dispersal of finely divided particles of silver oxide in admixture with a metal oxide.

9. A process for the removal of carbon dioxide from a gas containing same which comprises absorbing the carbon dioxide from the gas with a highly porous solid absorbent comprising a co-precipitate of finely divided silver oxide and a microporous metal oxide.

10. A process for removing and recovering carbon dioxide from a gas containing same which comprises absorbing carbon dioxide from the gas with a solid absorbent derived from a co-precipitate of silver oxide and aluminum oxide, and heating said absorbent to liberate the carbon dioxide therefrom in substantially pure form and to restore the absorbing property of said absorbent.

References Cited by the Examiner
UNITED STATES PATENTS

| | | | |
|---|---|---|---|
| 2,769,016 | 10/1956 | Lichtenwalter et al. | 252—476 X |
| 3,078,637 | 2/1963 | Milton | 55—68 |

REUBEN FRIEDMAN, *Primary Examiner.*